United States Patent
Chen et al.

(10) Patent No.: US 7,426,243 B2
(45) Date of Patent: Sep. 16, 2008

(54) PREPROCESSING SIGNAL LAYERS IN A LAYERED MODULATION DIGITAL SIGNAL SYSTEM TO USE LEGACY RECEIVERS

(75) Inventors: Ernest C. Chen, San Pedro, CA (US); Tiffany S. Furuya, Los Angeles, CA (US); Philip R. Hilmes, Santa Monica, CA (US); Joseph Santoru, Agoura Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 11/619,173

(22) Filed: Jan. 2, 2007

(65) Prior Publication Data

US 2007/0147547 A1     Jun. 28, 2007

Related U.S. Application Data

(63) Continuation of application No. 10/068,039, filed on Feb. 5, 2002, now Pat. No. 7,245,671, which is a continuation-in-part of application No. 09/844,401, filed on Apr. 27, 2001, now Pat. No. 7,209,524, and a continuation-in-part of application No. 10/068,047, filed on Feb. 5, 2002, now Pat. No. 7,173,981.

(51) Int. Cl.
*H03K 9/00* (2006.01)
(52) U.S. Cl. .................... 375/316; 375/349; 375/320; 375/343; 375/235; 375/261; 329/308; 370/206; 455/17
(58) Field of Classification Search ............... 375/316, 375/320, 343, 261, 235, 298, 349, 308, 377, 375/279, 281; 342/152; 332/103; 329/304, 329/308; 370/206; 455/17
See application file for complete search history.

(56) References Cited

U.S. PATENT DOCUMENTS 3,076,180 A     1/1963     Havens et al.

(Continued)

FOREIGN PATENT DOCUMENTS

DE     3642213     12/1986

(Continued)

OTHER PUBLICATIONS

The Authoritive Dictionary of IEEE Standards Terms; Seventh Edition, pp. 1047—definition of "signal" 2000.

(Continued)

*Primary Examiner*—Mohammad Ghayour
*Assistant Examiner*—Juan A. Torres

(57) ABSTRACT

Systems and methods for receiving non-coherent layered modulation signals are presented. An exemplary apparatus comprises a tuner for receiving a layered signal and producing a layered in-phase signal and a layered quadrature signal therefrom, an analog-to-digital converter for digitizing the layered in-phase signal and the layered quadrature signal, a processor for decoding the layered in-phase signal and the layered quadrature signal to produce a single layer in-phase signal and a single layer quadrature signal, a digital-to-analog encoder for converting the single layer in-phase signal and the single layer quadrature signal to a single layer in-phase analog signal and a single layer quadrature analog signal and a modulator for modulating the single layer in-phase analog signal and the single layer quadrature analog signal to produce a single layer signal.

21 Claims, 8 Drawing Sheets

U.S. PATENT DOCUMENTS

| | | | |
|---|---|---|---|
| 3,383,598 A | 5/1968 | Sanders |
| 3,878,468 A | 4/1975 | Falconer et al. |
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |
| 4,416,015 A | 11/1983 | Gitlin |
| 4,422,175 A | 12/1983 | Bingham et al. |
| 4,484,337 A | 11/1984 | Leclert et al. |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |
| 4,637,017 A | 1/1987 | Assal et al. |
| 4,647,873 A | 3/1987 | Beckner et al. |
| 4,654,863 A | 3/1987 | Belfield et al. |
| 4,670,789 A | 6/1987 | Plume |
| 4,709,374 A | 11/1987 | Farrow |
| 4,800,573 A | 1/1989 | Cupo |
| 4,829,543 A | 5/1989 | Borth et al. |
| 4,835,790 A | 5/1989 | Yoshida et al. |
| 4,847,864 A | 7/1989 | Cupo |
| 4,860,315 A | 8/1989 | Hosoda et al. |
| 4,878,030 A | 10/1989 | Vincze |
| 4,896,369 A | 1/1990 | Adams et al. |
| 4,918,708 A | 4/1990 | Pottinger et al. |
| 4,993,047 A | 2/1991 | Moffatt et al. |
| 5,043,734 A | 8/1991 | Niho |
| 5,088,110 A | 2/1992 | Bonnerot et al. |
| 5,111,155 A | 5/1992 | Keate et al. |
| 5,121,414 A | 6/1992 | Levine et al. |
| 5,199,047 A | 3/1993 | Koch |
| 5,206,889 A | 4/1993 | Unkrich |
| 5,221,908 A | 6/1993 | Katz et al. |
| 5,229,765 A | 7/1993 | Gardner |
| 5,233,632 A | 8/1993 | Baum et al. |
| 5,237,292 A | 8/1993 | Chethik |
| 5,285,474 A | 2/1994 | Chow et al. |
| 5,285,480 A | 2/1994 | Chennakeshu et al. |
| 5,317,599 A | 5/1994 | Obata |
| 5,329,311 A | 7/1994 | Ward et al. |
| 5,337,014 A | 8/1994 | Najle et al. |
| 5,353,307 A | 10/1994 | Lester et al. |
| 5,412,325 A | 5/1995 | Meyers |
| 5,430,770 A | 7/1995 | Abbey |
| 5,450,623 A | 9/1995 | Yokoyama et al. |
| 5,467,197 A | 11/1995 | Hoff |
| 5,471,508 A | 11/1995 | Koslov |
| 5,493,307 A | 2/1996 | Tsujimoto |
| 5,513,215 A | 4/1996 | Marchetto et al. |
| 5,555,257 A | 9/1996 | Dent |
| 5,577,067 A | 11/1996 | Zimmerman |
| 5,577,087 A | 11/1996 | Furuya |
| 5,579,344 A | 11/1996 | Namekata |
| 5,581,229 A | 12/1996 | Hunt |
| 5,592,481 A | 1/1997 | Wiedeman et al. |
| 5,602,868 A | 2/1997 | Wilson |
| 5,603,084 A | 2/1997 | Henry et al. |
| 5,606,286 A | 2/1997 | Bains |
| 5,608,331 A | 3/1997 | Newberg et al. |
| 5,625,640 A | 4/1997 | Palmer et al. |
| 5,642,358 A | 6/1997 | Dent |
| 5,644,592 A | 7/1997 | Divsalar et al. |
| 5,648,955 A | 7/1997 | Jensen et al. |
| 5,732,113 A | 3/1998 | Schmidl et al. |
| 5,793,818 A | 8/1998 | Claydon et al. |
| 5,815,531 A | 9/1998 | Dent |
| 5,819,157 A | 10/1998 | Ben-Efraim et al. |
| 5,828,710 A | 10/1998 | Beale |
| 5,848,060 A | 12/1998 | Dent |
| 5,870,439 A | 2/1999 | Ben-Efraim et al. |
| 5,870,443 A | 2/1999 | Rahnema |
| 5,937,004 A | 8/1999 | Fasulo et al. |
| 5,940,025 A | 8/1999 | Koehnke et al. |
| 5,940,750 A | 8/1999 | Wang |
| 5,946,625 A | 8/1999 | Hassan et al. |
| 5,952,834 A | 9/1999 | Buckley |
| 5,956,373 A | 9/1999 | Goldston et al. |
| 5,960,040 A | 9/1999 | Cai et al. |
| 5,963,845 A | 10/1999 | Floury et al. |
| 5,966,048 A | 10/1999 | Thompson |
| 5,966,186 A | 10/1999 | Shigihara et al. |
| 5,966,412 A | 10/1999 | Ramaswamy |
| 5,970,098 A | 10/1999 | Herzberg |
| 5,970,156 A | 10/1999 | Hummelgaard et al. |
| 5,970,429 A | 10/1999 | Martin |
| 5,978,652 A | 11/1999 | Burr et al. |
| 5,987,068 A | 11/1999 | Cassia et al. |
| 5,995,832 A | 11/1999 | Mallinckrodt |
| 5,999,793 A | 12/1999 | Ben-Efraim et al. |
| 6,002,713 A | 12/1999 | Goldstein et al. |
| 6,008,692 A | 12/1999 | Escartin |
| 6,018,556 A | 1/2000 | Janesch et al. |
| 6,021,159 A | 2/2000 | Nakagawa |
| 6,028,894 A | 2/2000 | Oishi et al. |
| 6,032,026 A | 2/2000 | Seki et al. |
| 6,034,952 A | 3/2000 | Dohi et al. |
| 6,049,566 A | 4/2000 | Saunders et al. |
| 6,052,586 A | 4/2000 | Karabinis |
| 6,055,278 A | 4/2000 | Ho et al. |
| 6,061,393 A | 5/2000 | Tsui et al. |
| 6,072,841 A | 6/2000 | Rahnema |
| 6,078,645 A | 6/2000 | Cai et al. |
| 6,084,919 A | 7/2000 | Kleider et al. |
| 6,104,747 A | 8/2000 | Jalloul et al. |
| 6,108,374 A | 8/2000 | Balachandran et al. |
| 6,125,148 A | 9/2000 | Frodigh et al. |
| 6,125,260 A | 9/2000 | Wiedeman et al. |
| 6,128,357 A | 10/2000 | Lu et al. |
| 6,131,013 A | 10/2000 | Bergstrom et al. |
| 6,134,282 A | 10/2000 | Ben-Efraim et al. |
| 6,140,809 A | 10/2000 | Doi |
| 6,141,534 A | 10/2000 | Snell et al. |
| 6,144,708 A | 11/2000 | Maruyama |
| 6,166,601 A | 12/2000 | Shalom et al. |
| 6,177,836 B1 | 1/2001 | Young et al. |
| 6,178,158 B1 | 1/2001 | Suzuki et al. |
| 6,188,717 B1 | 2/2001 | Kaiser et al. |
| 6,192,088 B1 | 2/2001 | Aman et al. |
| 6,212,360 B1 | 4/2001 | Fleming et al. |
| 6,219,095 B1 | 4/2001 | Zhang et al. |
| 6,246,717 B1 | 6/2001 | Chen et al. |
| 6,249,180 B1 | 6/2001 | Maalej et al. |
| 6,266,534 B1 | 7/2001 | Raith et al. |
| 6,272,679 B1 | 8/2001 | Norin |
| 6,275,678 B1 | 8/2001 | Bethscheider et al. |
| 6,297,691 B1 | 10/2001 | Anderson et al. |
| 6,304,594 B1 | 10/2001 | Salinger |
| 6,307,435 B1 | 10/2001 | Nguyen et al. |
| 6,313,885 B1 | 11/2001 | Patel et al. |
| 6,314,441 B1 | 11/2001 | Raghunath |
| 6,320,464 B1 | 11/2001 | Suzuki et al. |
| 6,320,919 B1 | 11/2001 | Khayrallah et al. |
| 6,325,332 B1 | 12/2001 | Cellier et al. |
| 6,330,336 B1 | 12/2001 | Kasama |
| 6,333,924 B1 | 12/2001 | Porcelli et al. |
| 6,335,951 B1 | 1/2002 | Cangiani et al. |
| 6,366,309 B1 | 4/2002 | Siegle |
| 6,369,648 B1 | 4/2002 | Kirkman |

| | | |
|---|---|---|
| 6,377,116 B1 | 4/2002 | Mattsson et al. |
| 6,389,002 B1 | 5/2002 | Schilling |
| 6,411,659 B1 | 6/2002 | Liu et al. |
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Rudolph et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,574,235 B1 | 6/2003 | Arslan et al. |
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,731,622 B1 | 5/2004 | Frank et al. |
| 6,731,700 B1 | 5/2004 | Yakhnich et al. |
| 6,745,050 B1 | 6/2004 | Forsythe et al. |
| 6,754,872 B2 | 6/2004 | Zhang et al. |
| 6,772,182 B1 | 8/2004 | McDonald et al. |
| 6,775,521 B1 | 8/2004 | Chen |
| 6,795,496 B1 | 9/2004 | Soma et al. |
| 6,809,587 B2 | 10/2004 | Ghannouchi et al. |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 | 1/2006 | Uesugi et al. |
| 6,999,510 B2 | 2/2006 | Batruni |
| 7,041,406 B2 | 5/2006 | Schuler et al. |
| 7,073,116 B1 * | 7/2006 | Settle et al. .............. 714/786 |
| 7,079,585 B1 * | 7/2006 | Settle et al. .............. 375/261 |
| 7,154,958 B2 | 12/2006 | Dabak et al. |
| 7,161,931 B1 | 1/2007 | Li et al. |
| 7,173,981 B1 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 7,230,480 B2 | 3/2008 | Chen et al. |
| 2001/0012322 A1 | 8/2001 | Nagaoka et al. |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0051435 A1 | 5/2002 | Giallorenzi et al. |
| 2002/0071506 A1 | 6/2002 | Lindquist et al. |
| 2002/0082792 A1 | 6/2002 | Bourde et al. |
| 2002/0136327 A1 | 9/2002 | El-Gamal et al. |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0147472 A1 | 8/2003 | Bach et al. |
| 2003/0171102 A1 | 9/2003 | Yang |
| 2003/0185310 A1 | 10/2003 | Ketchum et al. |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1 | 1/2006 | Chen |
| 2006/0022747 A1 | 2/2006 | Chen et al. |
| 2006/0045191 A1 | 3/2006 | Vasanth et al. |
| 2006/0056541 A1 | 3/2006 | Chen et al. |
| 2007/0011716 A1 | 1/2007 | Koslov et al. |
| 2007/0121718 A1 | 5/2007 | Wang et al. |

FOREIGN PATENT DOCUMENTS

| | | |
|---|---|---|
| EP | 0115218 | 8/1984 |
| EP | 0222076 | 8/1986 |
| EP | 0238822 | 9/1987 |
| EP | 0356096 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1065854 | 1/2001 |
| EP | 1335512 | 8/2003 |
| FR | 2696295 | 4/1994 |
| FR | 2724522 | 3/1996 |
| JP | 2-005631 | 1/1990 |
| JP | 2-095033 | 4/1990 |
| JP | 03139027 | 6/1991 |
| JP | 5-041683 | 2/1993 |
| JP | 5-114878 | 5/1993 |
| JP | 5-252084 | 9/1993 |
| JP | 07-038615 | 2/1995 |
| JP | 2001-244832 | 9/2001 |
| JP | 2002118611 | 4/2002 |
| KR | 2001 0019997 | 3/2001 |
| WO | WO 99/00957 | 1/1999 |
| WO | WO 99/20001 | 4/1999 |
| WO | WO 99/23718 | 5/1999 |
| WO | 0079753 A1 | 12/2000 |
| WO | 0113532 A1 | 2/2001 |
| WO | WO 01/19013 | 3/2001 |
| WO | WO 01/39455 | 5/2001 |
| WO | WO 01/39456 | 5/2001 |
| WO | WO 01/80471 | 10/2001 |
| WO | WO 02/073817 | 9/2002 |
| WO | WO 2005/074171 | 8/2005 |
| WO | WO 2005/086444 | 9/2005 |

OTHER PUBLICATIONS

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-6112; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Palicot, J., Veillard, J.; "Possible Coding and Modulation Approaches to Improve Service Availability for Digital HDTV Satellite Broadcasting at 22 GHz"; IEEE Transactions on Consumer Electronics; Vol. 39, Issue 3; Aug. 1993; pp. 660-667.

U.S. Appl. No. 10/693,135, filed Oct. 24, 2003, Chen.

U.S. Appl. No. 10/532,632, filed Apr. 25, 2003, Chen et al.

U.S. Appl. No. 10/692,491, filed Oct. 24, 2003, Ernest C. Chen.

U.S. Appl. No. 11/603,776, filed Nov. 22, 2006, Ernest C. Chen.

Scott, R. P. et al.; Ultralow Phase Noise Ti:sapphire Laser Rivals 100 MHz Crystal Oscillator; Nov. 11-15, 2001; IEEE-Leos; pp. 1-2.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

U.S. Appl. No. 10/519,375, filed Dec. 22, 2004, Ernest C. Chen, Non-final Communication dated Dec. 27, 2007.

U.S. Appl. No. 10/913,927, filed Aug. 5, 2004, Ernest C. Chen, Non-final Communication dated Dec. 11, 2007.

U.S. Appl. No. 10/532,631, filed Apr. 25, 2005, Paul R. Anderson, Non-final Communication dated Nov. 19, 2007.

U.S. Appl. No. 10/691,032, filed Oct. 22, 2003, Weizheng Wang, Non-final Communication dated Nov. 16, 2007.

U.S. Appl. No. 10/519,322, filed Dec. 23, 2004, Ernest C. Chen, Notice of Allowance dated Dec. 11, 2007.

U.S. Appl. No. 10/532,619, filed Apr. 25, 2005, Ernest C. Chen, Notice of Allowance dated Dec. 26, 2007.

U.S. Appl. No. 11/603,776, filed Nov. 22, 2006, Ernest C. Chen, Notice of Allowance dated Jan. 2, 2008.

U.S. Appl. No. 10/692,539, Oct. 24, 2003, Ernest C. Chen, Non-final Communication dated May 31, 2007.

U.S. Appl. No. 10/692,539, filed Oct. 24, 2003, Ernest C. Chen, Notice of Allowance dated Sep. 20, 2007.

U.S. Appl. No. 10/532,632, filed Apr. 25, 2005, Ernest C. Chen, Notice of Allowance dated Jan. 7, 2008.

Non-final Office Communication dated Apr. 1, 2008 in U.S. Appl. No. 10/961,579, filed Oct. 8, 2004 filed by Ernest C. Chen.

Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.

Non-final Communication dated Mar. 3, 2008 in U.S. Appl. No. 11/656,662 filed Jan. 22, 2007 by Ernest C. Chen et al.

Notice of Allowance dated Mar. 25, 2008 in U.S. Appl. No. 11/653,517 filed Jan. 16, 2007 by Ernest C. Chen.

EPO Communication dated Mar. 11, 2008 in European counterpart Application No. 03777694.5 of corresponding U.S. Appl. No. 10/532,509 filed Oct. 17, 2003 by Ernest Chen et al., now issued as Patent No. 7,230,480.

EPO Communication dated Mar. 7, 2008 in European counterpart Application No. 03742393.6 of corresponding U.S. Appl. No. 10/519,375 filed Jul. 3, 2003 by Ernest Chen et al.

Canadian Office Action dated Sep. 12, 2007 in Canadian counterpart Application No. 2491259 of corresponding U.S. Appl. No. 10/519,375 filed Jul. 3, 2003 by Ernest Chen et al.

EPO Communication dated Aug. 3, 2007 in European counterpart Application No. 03794510.2 of corresponding U.S. Appl. No. 10/236,414 filed Sep. 6, 2002 by Ernest Chen et al.

Non-final Communication dated Oct. 16, 2007 in U.S. Appl. No. 10/962,346 filed Oct. 8, 2004 by Ernest Chen.

Notice of Allowance dated May 6, 2008 in U.S. Appl. No. 10/532,631 filed Apr. 25, 2005 by Paul R. Anderson et al.

Non-final Office Action dated Apr. 30, 2008 in U.S. Appl. No. 10/962,346 filed Oct. 8, 2004 by Ernest Chen.

Notice of Allowance dated Apr. 30, 2008 in U.S. Appl. No. 11/603,776 filed Nov. 22, 2006 by Ernest Chen et al.

EPO Communication dated Apr. 4, 2008 in European counterpart Application No. 03757359.9 corresponding to U.S. Appl. No. 10/165,710 filed Jun. 7, 2002 by Ernest Chen.

Notice of Allowance dated Mar. 12, 2008 in U.S. Appl. No. 10/655,001 filed Jan. 18, 2007 by Weizheng Wang et al.

Japanese Office Action dated Mar. 4, 2008 in Japanese counterpart Application No. 2004-297297 corresponding to U.S. Appl. No. 10/962,346 filed Oct. 8, 2004 by Ernest Chen.

EPO Communication dated Feb. 26, 2008 in European counterpart Application No. 04256234.8 corresponding to U.S. Appl. No. 10/962,346 filed Oct. 8, 2004 by Ernest Chen.

EPO Communication dated Feb. 7, 2008 in European counterpart Application No. 03742400.9 and received from European representative on Feb. 14, 2008 and corresponding to U.S. Appl. No. 10/519,322 filed Dec. 23, 2004 by Ernest Chen et al.

Notice of Allowance dated Apr. 21, 2008 in U.S. Appl. No. 11/519,322 filed Dec. 23, 2004 by Ernest Chen et al.

Notice of Allowance dated May 6, 2008 in U.S. Appl. No. 10/532,632 filed Apr. 25, 2005 by Ernest Chen et al.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

EPO Communication dated May 6, 2008 in European counterpart Application No. 03774848.0 corresponding to U.S. Appl. No. 10/532,582 filed Apr. 25, 2005 by Ernest Chen et al., now issued Feb. 6, 2007 as U.S. Patent No. 7,173,977.

EPO Communication dated May 6, 2008 in European counterpart Application No. 03777627.5 corresponding to U.S. Appl. No. 10/532,619 filed Apr. 25, 2005 by Ernest Chen.

Notice of Allowance dated May. 22, 2008 in U.S. Appl. No. 10/532,619 filed May. 25, 2005 by Ernest Chen.

Final Rejection dated Jun. 24, 2008 in U.S. Appl. No. 10/519,375 filed Dec. 22, 2004 by Ernest C. Chen et al.

Non-Final Office Action dated Jun. 17, 2008 in U.S. Appl. No. 10/913,927 filed Aug. 5, 2004 by Ernest C. Chen.

EPO Search Report and Search Opinion dated Jun. 13, 2008 in European counterpart Application No. 07075745.5 corresponding to U.S. Appl. No. 09/844,401 filed Apr. 27, 2001 by Ernest Chen, now issued Apr. 24, 2007 as U.S. Patent No. 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalart, Pascal; LeClerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

Canadian Office Action dated Apr. 22, 2008 in Canadian counterpart Application No. 2502924 corresponding to U.S. Appl. No. 10/532,619 filed Apr. 25, 2005 by Ernest C. Chen.

Notice of Allowance dated Jun. 13, 2008 in U.S. Appl. No. 10/532,524 filed Apr. 25, 2005 by Ernest C. Chen et al.

Non-Final Office Action dated Apr. 30, 2008 in U.S. Appl. No. 10/962,346 filed Oct. 8, 2004 by Ernest C. Chen.

EPO Summons to attend Oral Proceedings dated Jul. 18, 2008 in European counterpart Application No. 02728894.3 corresponding to U.S. Appl. No. 09/844,401 filed Apr. 27, 2001 by Ernest Chen, now issued Apr. 24, 2007 as U.S. Patent No. 7,209,524.

Taiwanese Office Action dated May 14, 2008 in Taiwan counterpart Application No. 092129629 corresponding to U.S. Appl. No. 10/532,631 filed Apr. 25, 2005 by Paul R. Anderson et al.

\* cited by examiner

PREPROCESSING SIGNAL LAYERS IN A LAYERED MODULATION DIGITAL SIGNAL SYSTEM TO USE LEGACY RECEIVERS

CROSS-REFERENCE TO RELATED APPLICATIONS

This application is a continuation of U.S. patent application Ser. No. 10/068,039, filed Feb. 5, 2002 now U.S. Pat. No. 7,245,671 which is a continuation-in-part application claiming priority under 35 U.S.C. §120 from U.S. patent application Ser. No. 09/844,401, filed Apr. 27, 2001, and entitled "LAYERED MODULATION FOR DIGITAL SIGNALS", now issued as U.S. Pat. No. 7,209,524 and from U.S. patent application Ser. No. 10/068,047, filed Feb. 5, 2002, and entitled "DUAL LAYER SIGNAL PROCESSING IN A LAYERED MODULATION DIGITAL SIGNAL SYSTEM", now issued as U.S. Pat. No. 7,173,981, all of which applications are hereby incorporated by reference herein.

This application is also related to the following applications:

Application Ser. No. 11/653,517, entitled "LAYERED MODULATION FOR DIGITAL SIGNALS," filed on Jan. 16, 2007, by Ernest C. Chen, which is a continuation of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/165,710, entitled "SATELLITE TWTA ON-LINE NON-LINEARITY MEASUREMENT," filed on Jun. 7, 2002, by Ernest C. Chen, which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/236,414, entitled "SIGNAL, INTERFERENCE AND NOISE POWER MEASUREMENT," filed on Sep. 6, 2002, by Ernest C. Chen and Chinh Tran, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,135, entitled "LAYERED MODULATION FOR ATSC APPLICATIONS," filed on Oct. 24, 2003, by Ernest C. Chen, which claims benefit to Provisional Patent Application 60/421,327, filed Oct. 25, 2002 and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/913,927, entitled "CARRIER TO NOISE RATIO ESTIMATIONS FROM A RECEIVED SIGNAL," filed on Aug. 5, 2004, by Ernest C. Chen which is a continuation in part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,421, entitled "FAST ACQUISITION OF TIMING AND CARRIER FREQUENCY FROM RECEIVED SIGNAL," filed on Oct. 24, 2003, by Ernest C. Chen, now issued as U.S. Pat. No. 7,151,807, which claims priority to Provisional Patent Application Ser. No. 60/421,292, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/603,776, entitled "DUAL LAYER SIGNAL PROCESSING IN A LAYERED MODULATION DIGITAL SIGNAL SYSTEM," filed on Nov. 22, 2006, by Ernest C. Chen, Tiffany S. Furuya, Philip R. Hilmes, and Joseph Santoru, which is a continuation of application Ser. No. 10/068,047, entitled "DUAL LAYER SIGNAL PROCESSING IN A LAYERED MODULATION DIGITAL SIGNAL SYSTEM," filed on Feb. 5, 2002, by Ernest C. Chen, Tiffany S. Furuya, Philip R. Hilmes, and Joseph Santoru, now issued as U.S. Pat. No. 7,173,981, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/69 1,032, entitled "UNBLIND EQUALIZER ARCHITECTURE FOR DIGITAL COMMUNICATION SYSTEMS," filed on Oct. 22, 2003, by Weizheng W. Wang, Tung-Sheng Lin, Ernest C. Chen, and William C. Lindsey, which claims priority to Provisional Patent Application Ser. No. 60/421,329, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/962,346, entitled "COHERENT AVERAGING FOR MEASURING TRAVELING WAVE TUBE AMPLIFIER NONLINEARITY," filed on Oct. 8, 2004, by Ernest C. Chen, which claims priority to Provisional Patent Application Ser. No. 60/510,368, filed Oct. 10, 2003, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/655,001, entitled "AN OPTIMIZATION TECHNIQUE FOR LAYERED MODULATION," filed on Jan. 18,2007, by Weizheng W. Wang, Guancai Zhou, Tung-Sheng Lin, Ernest C. Chen, Joseph Santoru, and William Lindsey, which claims priority to Provisional Patent Application 60/421,293, filed Oct. 25, 2002, and which is a continuation of application Ser. No. 10/693,140, entitled "OPTIMIZATION TECHNIQUE FOR LAYERED MODULATION," filed on Oct. 24, 2003, by Weizheng W. Wang, Guancai Zhou, Tung-Sheng Lin, Ernest C. Chen, Joseph Santoru, and William Lindsey, now issued as U.S. Pat. No. 7,184, 489, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/656,662, entitled "EQUALIZERS FOR LAYERED MODULATION AND OTHER SIGNALS," filed on Jan. 22, 2007, by Ernest C. Chen, Tung-Sheng Lin, Weizheng W. Wang, and William C. Lindsey, which claims priority to Provisional Patent Application 60/421,241, filed Oct. 25, 2002, and which is a continuation of application Ser. No. 10/691,133, entitled "EQUALIZERS FOR LAYERED MODULATED AND OTHER SIGNALS," filed on Oct. 22, 2003, by Ernest C. Chen, Tung-Sheng Lin, Weizheng W. Wang, and William C. Lindsey, now issued as U.S. Pat. No. 7,184,473, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/961,579, entitled "EQUALIZATION FOR TWTA NONLINEARITY MEASUREMENT" filed on Oct. 8, 2004, by Ernest C. Chen, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,632, entitled "LOWER COMPLEXITY LAYERED MODULATION SIGNAL PROCESSOR," filed on Apr. 25, 2005, by Ernest C. Chen, Weizheng W. Wang, Tung-Sheng Lin, Guangcai Zhou, and Joseph Santoru, which is a National Stage Application of PCT U503/32264, filed Oct. 10, 2003, which claims priority to Provisional Patent Application 60/421,331, entitled "LOWER COMPLEXITY LAYERED MODULATION SIGNAL PROCESSOR," filed Oct. 25, 2002, by Ernest C. Chen, Weizheng W. Wang, Tung-Sheng Lin, Guangcai Zhou, and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,631, entitled "FEEDER LINK CONFIGURATIONS TO SUPPORT LAYERED MODULATION FOR DIGITAL SIGNALS," filed on Apr. 25, 2005, by Paul R. Anderson, Joseph Santoru and Ernest C. Chen, which is a National Phase Application of PCT US03/33255, filed Oct. 20, 2003, which claims priority to Provisional Patent Application 60/421,328, entitled "FEEDER LINK CONFIGURATIONS TO SUPPORT LAYERED MODULATION FOR DIGITAL SIGNALS," filed Oct. 25, 2002, by Paul R. Anderson, Joseph Santoru and Ernest C. Chen, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,619, entitled "MAXIMIZING POWER AND SPECTRAL EFFICIENCIES FOR LAYERED AND CONVENTIONAL MODULATIONS," filed on Apr. 25, 2005, by Ernest C. Chen, which is a National Phase Application of PCT Application US03/32800, filed Oct. 16, 2003, which claims priority to Provisional Patent Application 60/421,288, entitled "MAXIMIZING POWER AND SPECTRAL EFFICIENCIES FOR LAYERED AND CONVENTIONAL MODULATION," filed Oct. 25, 2002, by Ernest C. Chen and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, Application Ser. No. 10/532,524, entitled "AMPLITUDE AND PHASE MATCHING FOR LAYERED MODULATION RECEPTION," filed on Apr. 25, 2005, by Ernest C. Chen, Jeng-Hong Chen, Kenneth Shum, and Joungheon Oh, which is a National Phase Application of PCT Application US03/31199, filed Oct. 3, 2003, which claims priority to Provisional Patent Application 60/421,332, entitled "AMPLITUDE AND PHASE MATCHING FOR LAYERED MODULATION RECEPTION," filed Oct. 25, 2002, by Ernest C. Chen, Jeng-Hong Chen, Kenneth Shum, and Joungheon Oh, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, and also claims priority to;

Application Ser. No. 10/532,582, entitled "METHOD AND APPARATUS FOR TAILORING CARRIER POWER REQUIREMENTS ACCORDING TO AVAILABILITY IN LAYERED MODULATION SYSTEMS," filed on Apr. 25, 2005, by Ernest C. Chen, Paul R. Anderson and Joseph Santoru, now issued as U.S. Pat. No. 7,173,977, which is a National Stage Application of PCT Application US03/32751, filed Oct. 15, 2003, which claims priority to Provisional Patent Application 60/421,333, entitled "METHOD AND APPARATUS FOR TAILORING CARRIER POWER REQUIREMENTS ACCORDING TO AVAILABILITY IN LAYERED MODULATION SYSTEMS," filed Oct. 25, 2002, by Ernest C. Chen, Paul R. Anderson and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,509, entitled "ESTIMATING THE OPERATING POINT ON A NONLINEAR TRAVELING WAVE TUBE AMPLIFIER," filed on Apr. 25, 2005, by Ernest C. Chen and Shamik Maitra, now issued as U.S. Pat. No. 7,230,480, which is a National Stage Application of PCT Application US03/33130 filed Oct. 17, 2003, and which claims priority to Provisional Patent Application 60/421,289, entitled "ESTIMATING THE OPERATING POINT ON A NONLINEAR TRAVELING WAVE TUBE AMPLIFIER," filed Oct. 25, 2002, by Ernest C. Chen and Shamik Maitra, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,322, entitled "IMPROVING HIERARCHICAL 8PSK PERFORMANCE," filed on Dec. 23, 2004 by Ernest C. Chen and Joseph Santoru, which is a National Stage Application of PCT US03/020862 filed Jul. 1, 2003, which claims priority to Provisional Patent Application 60/392,861, filed Jul. 1, 2002 and Provisional Patent Application 60/392,860, filed Jul. 1, 2002, and which is also related to application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,375, entitled "METHOD AND APPARATUS FOR LAYERED MODULATION," filed on Jul. 3,2003, by Ernest C. Chen and Joseph Santoru, which is a National Stage Application of PCT US03/20847, filed Jul. 3, 2003, which claims priority to Provisional Patent Application 60/393,437 filed Jul. 3, 2002, and which is related to application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/692,539, entitled "ON-LINE PHASE NOISE MEASUREMENT FOR LAYERED MODULATION", filed Oct. 24, 2003, by Ernest C. Chen, which claims priority from Provisional Patent Application 60/421,291, filed Oct. 25, 2002, entitled "ON-LINE PHASE NOISE MEASUREMENT FOR LAYERED MODULATION"; and Application Ser. No. 10/692,491, entitled "ONLINE OUTPUT MULTIPLEXER FILTER MEASUREMENT," filed on Oct. 24, 2003, by Ernest C. Chen, which claims priority to Provisional Patent Application 60/421,290, filed Oct. 25, 2002, and which is a continuation-in-part of Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524.

BACKGROUND OF THE INVENTION

1. Field of the Invention

The present invention relates generally to systems for receiving digital signals, and in particular, to systems for receiving layered modulation in digital signals.

2. Description of the Related Art

As various digital signal communication systems and services evolve, there is a burgeoning demand for increased data throughput and added services. However, it is more difficult to implement improvements in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate 8PSK or 16QAM signals. As a result, legacy customers with QPSK receivers must upgrade their receivers in order to continue to receive any signals transmitted with an 8PSK or 16QAM modulation.

Layered modulation enables systems and methods of transmitting signals to accommodate enhanced and increased data throughput without requiring additional frequency bands. Systems using layered modulation can provide enhanced and increased throughput signals for new receivers while remaining compatible with legacy receivers. Newer layered modulation techniques (such as detailed in U.S. patent application Ser. No. 09/844,401, filed Apr. 27, 2001, and entitled "LAYERED MODULATION FOR DIGITAL SIGNALS) also provide the unique advantage of allowing transmission signals to be upgraded from a source separate from the legacy transmitter. In other words, the layered signals can be asynchronous and/or non-coherent.

Related receiver systems for layered signals have also been described, such as those found in U.S. Pat. No. 4,039,961, which is incorporated by reference herein. However, such receiver systems are based on analog circuits, synchronized by a voltage control oscillator. In addition, such receiver systems are limited because they are designed to only receive coherent layered signals, i.e. signals that are synchronously produced.

Accommodating legacy receivers is also an important consideration when layered modulation is employed to enhance a preexisting system. Although proper design of the layered modulation signal can enable legacy receivers to receive legacy layers of the signal, the new signal layers will not be accessible by legacy receivers. In addition, it may not always be possible (or preferable) to accommodate the legacy receivers in designing the new layered modulation signal. In which case, the legacy receivers would be rendered incompatible with the new layered modulation signal.

There is a need for systems and methods for receiving and processing the layered modulation signals. There is also a need for systems and methods to enable legacy receivers to receive all layers of the layered signal. There is further a need for systems and methods which enable legacy receivers to be operable if the layered modulation signal is otherwise incompatible with the legacy receiver. The present invention meets these needs.

SUMMARY OF THE INVENTION

The present invention provides a flexible and expandable apparatus that can be implemented with high speed logic circuit technology capable of performing demodulator functions and processing of received layered modulation signals in real-time. The invention utilizes high speed digitization of the incoming signal to prepare it for further high-speed digital processing. The invention enables a receive system architecture wherein the incoming signal is split and separately directed to distinct integrated receiver/decoders (IRDs). The system facilitates compatibility with legacy IRDs. One legacy IRD can be used to receive the upper modulation layer as it would receive a conventional unlayered signal. In this IRD the lower modulation layer is ignored as noise. A second legacy IRD receives a signal that has been preprocessed to extract and convert the lower modulation signal to a legacy IRD compatible signal.

An exemplary apparatus comprises a tuner for receiving a layered signal and producing a layered in-phase signal and a layered quadrature signal therefrom, an analog-to-digital converter for digitizing the layered in-phase signal and the layered quadrature signal, a processor for decoding the layered in-phase signal and the layered quadrature signal to produce a single layer in-phase signal and a single layer quadrature signal, a digital-to-analog encoder for converting the single layer in-phase signal and the single layer quadrature signal to a single layer in-phase analog signal and a single layer quadrature analog signal and a modulator for modulating the single layer in-phase analog signal and the single layer quadrature analog signal to produce a single layer signal.

Preferably, the layered signal is designed to be compatible with a legacy receiver such that at least one signal layer is decodeable directly from the layered signal with the legacy receiver. The apparatus produces a single layer signal that is also decodeable with a legacy receiver.

To facilitate high speed signal processing, the processor can comprise a logic circuit. Decoding by the processor can start with match filtering the layered in-phase signal and the layered quadrature signal.

In one embodiment, the processor demodulates and decodes an upper layer signal from the layered in-phase signal and the layered quadrature signal. The processor further produces an ideal noise free upper layer signal including an ideal in-phase upper layer signal and an ideal quadrature upper layer signal from the decoded upper layer signal and subtracts the ideal in-phase upper layer signal and the ideal quadrature upper layer signal from the layered in-phase signal and the layered quadrature signal, respectively, to produce the single lower layer in-phase signal and the single lower layer quadrature signal. In a further embodiment, the layered in-phase signal and the layered quadrature signal are delayed to synchronize the subtraction.

In other embodiments, producing the ideal upper layer signal comprises signal processing the ideal in-phase upper layer signal and the ideal quadrature upper layer signal. Signal processing the ideal upper layer can include many elements, including pulse shaping the ideal in-phase upper layer signal and the ideal quadrature upper layer signal. Signal mapping to account for transmission distortions of the layered analog signal can also be applied to the ideal in-phase upper layer signal and the ideal quadrature upper layer signal. The ideal upper layer signal can also be processed by amplitude and phase matching with the layered signal to improve signal subtraction results.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

1. Overview

The present invention provides for the reception of non-coherent legacy layered modulation signals using legacy receivers. The signal layers can be independently modulated and coded. Signal layers which are otherwise incompatible with the legacy receiver are preprocessed in a layered modulation decoder to convert them to a compatible format. Thus, all layers of the layered modulation signal can be received by splitting the incoming signal and directing it to different legacy receivers, preprocessing as necessary to extract the desired layer and present it in a compatible format. Preferably, at least one layer of the signal is compatible with a legacy receiver without being preprocessed.

2. Layered Signals

Figure 1A:
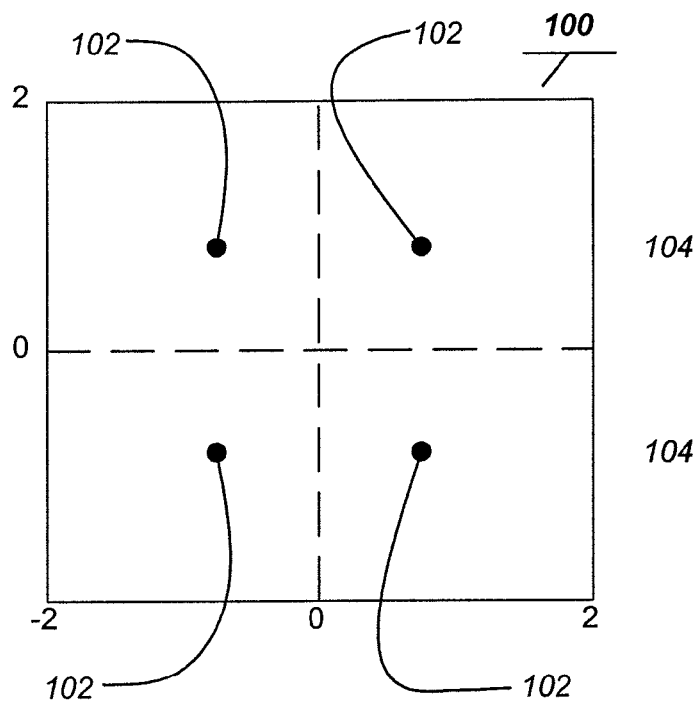
FIGS. 1A-1C illustrate the relationship of signal layers in a layered modulation transmission.
Figure 1B:
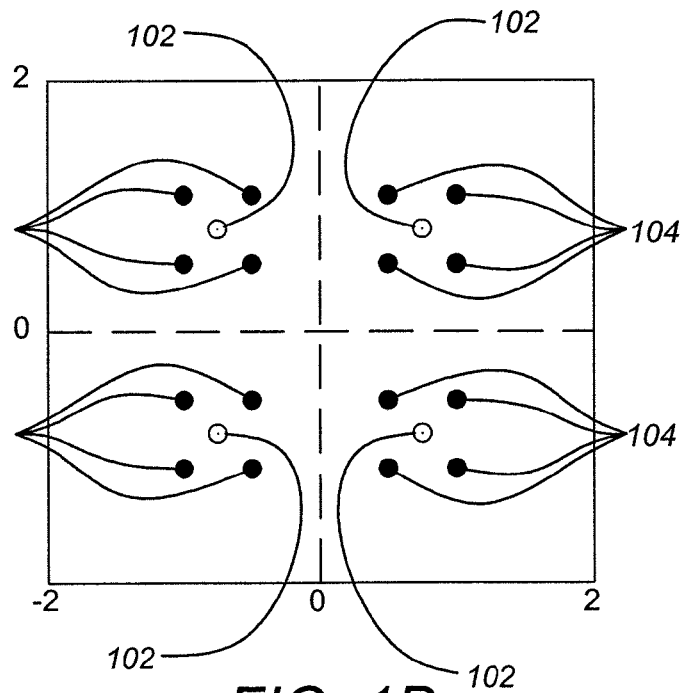
Figure 1C:
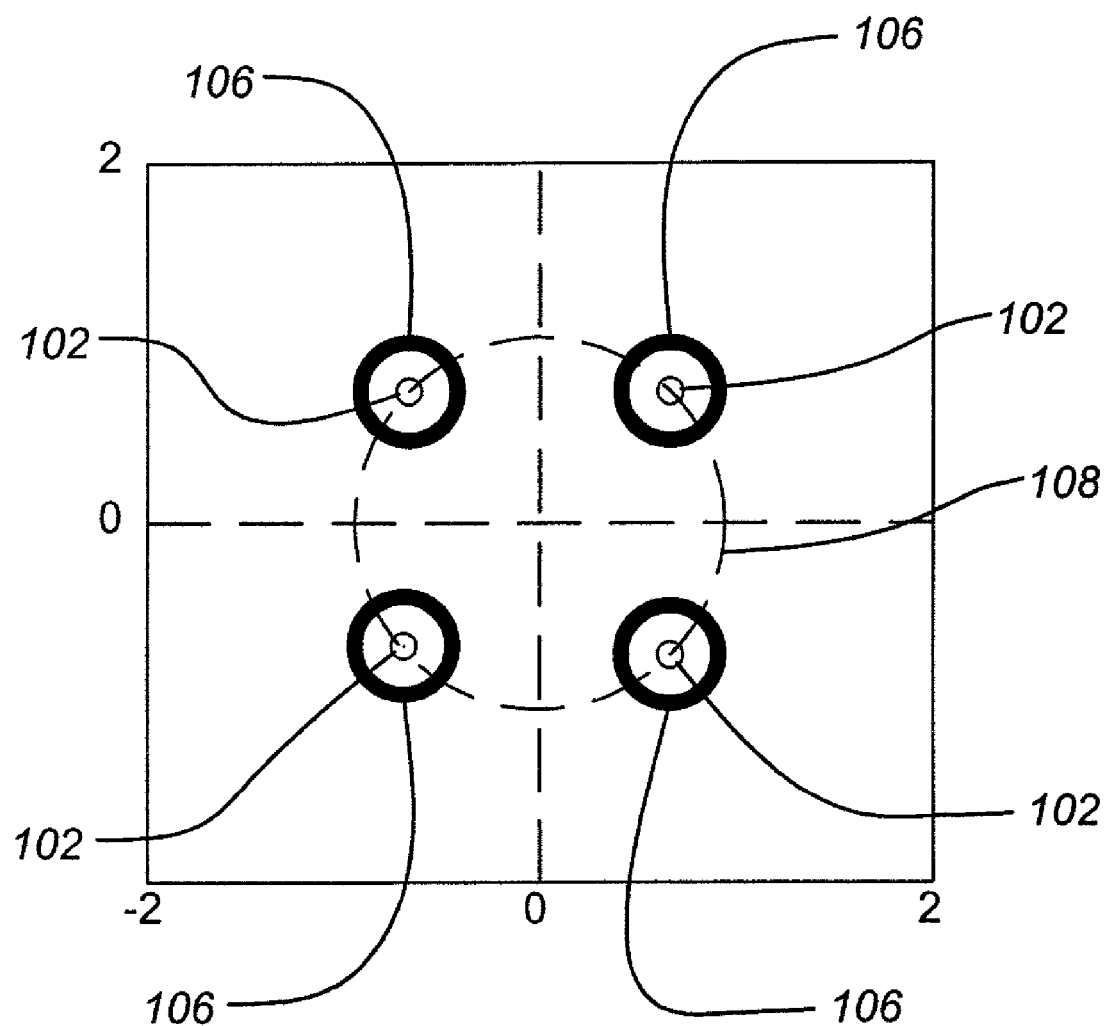

FIGS. 1A-1C and FIGS. 2A-2C illustrate a QPSK signal format in a two-layer example. FIGS. 1A-1C illustrate the basic relationship of signal layers in a layered modulation transmission. FIG. 1A illustrates a upper layer signal constellation 100 of a transmission signal showing the signal points or symbols 102. FIG. 1B illustrates the lower layer signal constellation of symbols 104 over the upper layer signal constellation 100 where the layers are coherent. FIG. 1C illustrates a lower signal layer 106 of a lower transmission layer over the upper layer constellation where the layers may be non-coherent. The lower layer 106 rotates about the upper layer constellation 102 due to the relative modulating frequencies of the two layers in a non-coherent transmission. Both the upper and lower layers rotate about the origin due to the upper layer modulation frequency as described by path 108.

Figure 2A:
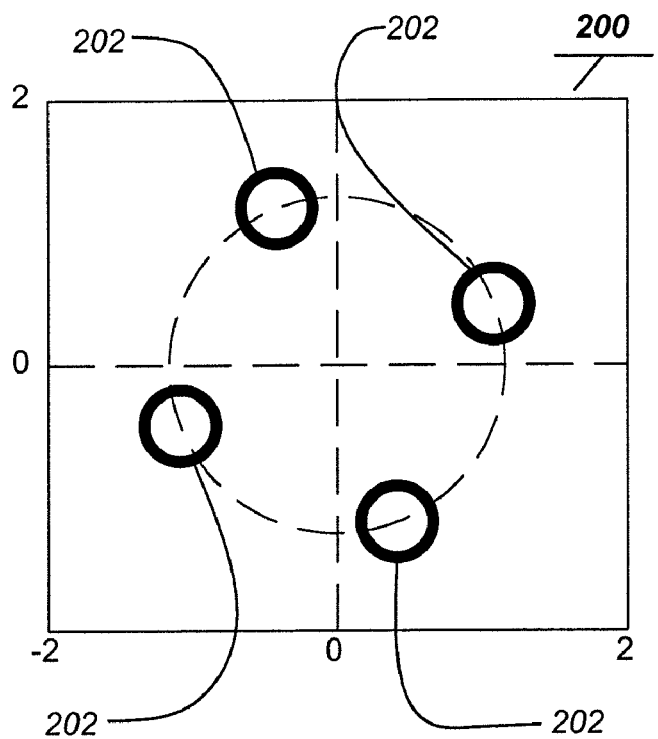
FIGS. 2A-2C illustrate a signal constellation of a second transmission layer over a first transmission layer non-coherently.
Figure 2B:
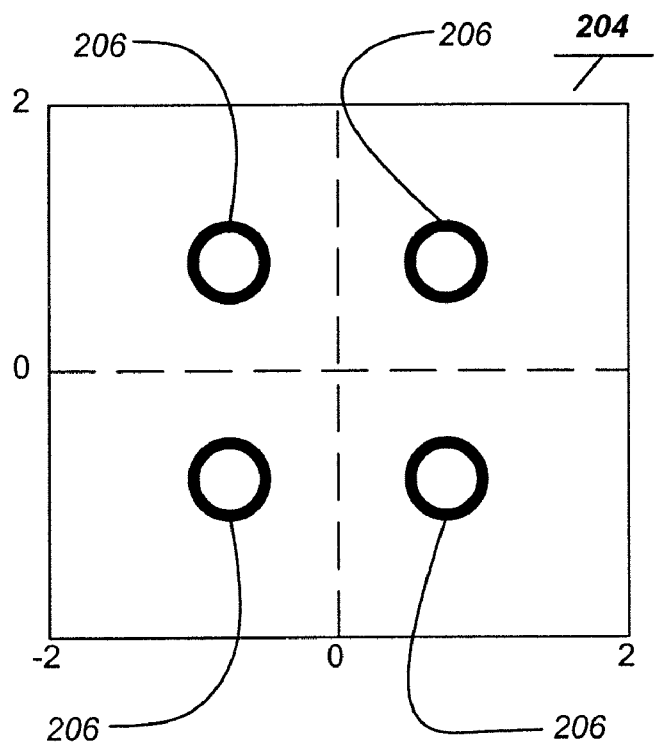
Figure 2C:
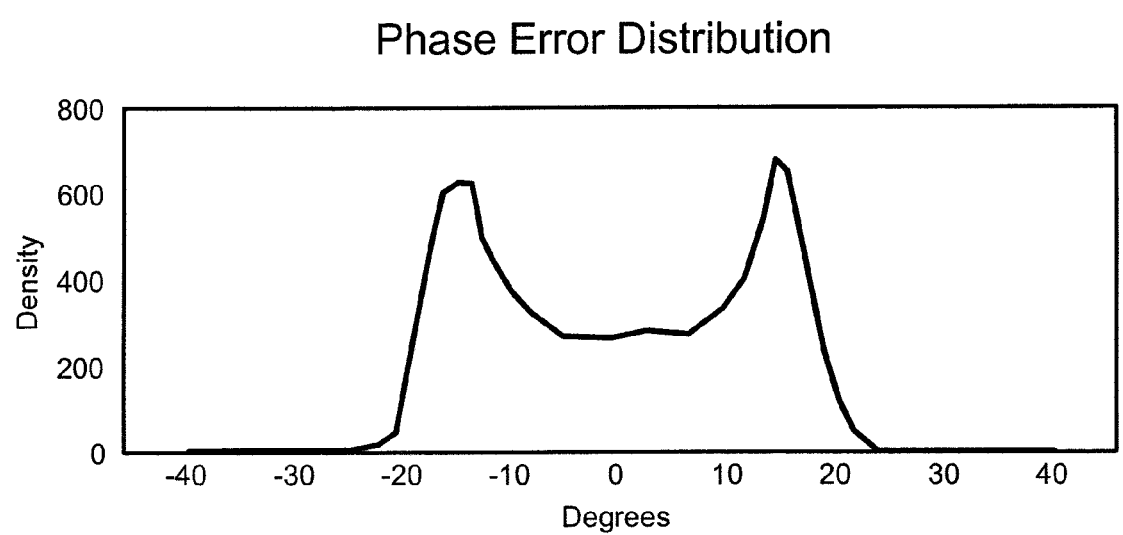

FIGS. 2A-2C illustrate a signal constellation of a lower transmission layer over the upper transmission layer after upper layer demodulation. FIG. 2A shows the constellation 200 before the upper carrier recovery loop (CRL) and FIG. 2B shows the constellation 200 after CRL. In this case, the signal points of the lower layer are rings 202. FIG. 2C depicts a phase distribution of the received signal with respect to nodes 102. As mentioned above, relative modulating frequencies cause the lower layer constellation to rotate around the nodes of the upper layer constellation. After the lower layer CRL this rotation is eliminated. The radius of the lower layer constellation is determined by its power level. The thickness of the rings 202 is determined by the carrier to noise ratio (CNR) of the lower layer.

Figure 3:
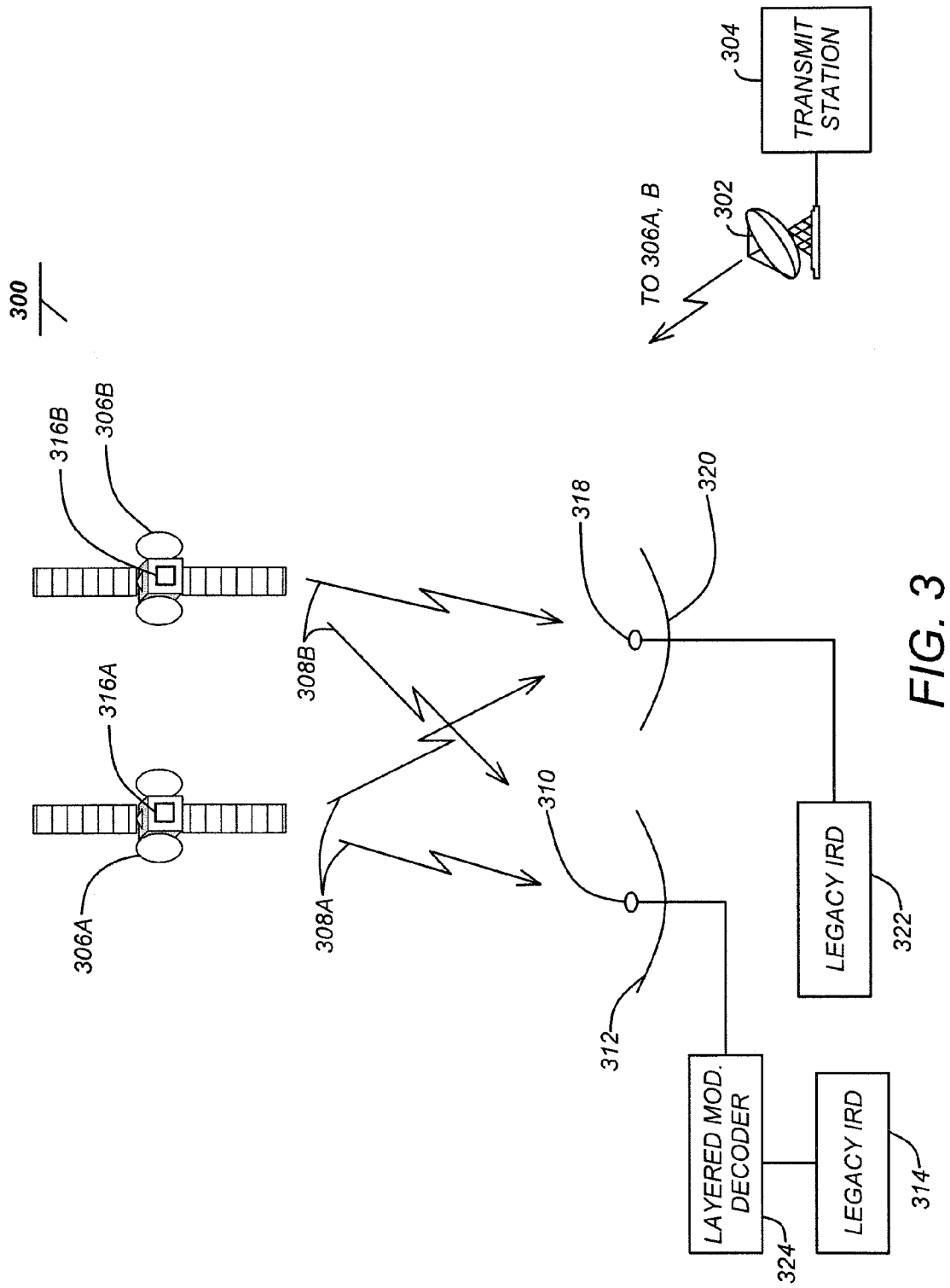
FIG. 3 is a block diagram for a typical transmission system for a receiver of the invention.

FIG. 3 is a block diagram for a typical system 300 of transmitting and receiving layered signals. Separate transmitters 316A, 316B, as may be located on any suitable platform, such as satellites 306A, 306B, are used to non-coherently transmit different layers of a signal of the present invention. It is noted that the transmitters may also be positioned on the same platform. Uplink signals are typically transmitted to each satellite 306A, 306B from one or more transmit stations 304 via an antenna 302. The layered signals 308A, 308B (downlink signals) are received at receiver antennas 312, 320 (which can alternately be a single antenna), such as satellite dishes, each with a low noise block (LNB) 310, 318 (which can likewise be a single LNB) where they are then coupled to legacy integrated receiver/decoders (IRDs) 322. One of the layered signals 308A can be distinguished and processed directly by the legacy IRD 322. Note that one satellite dish with one LNB can also be used to receive both the upper and lower layers.

With the invention, one legacy IRD 314 has the received layered signals 308A, 308B preprocessed in the layered modulation decoder 324 to separate and convert one of the layered signals 308B to a format compatible with the legacy IRDs 314, 322. It should be noted that antennas 312, 320 can each comprise more than one directional receiving dish to receive layered signals 308A, 308B from separate satellites as will be detailed in the receiver system described hereafter.

In addition, because the signal layers may be transmitted non-coherently, separate transmission layers may be added at any time using different satellites 306A, 306B or other suitable platforms, such as ground based or high altitude platforms. Thus, any composite signal, including new additional signal layers will be backwards compatible with legacy receivers which will disregard the new signal layers. To ensure that the signals are distinguishable, the combined signal and noise level for the lower layer must be at or below the allowed noise floor for the upper layer. Alternate receiver systems employing the invention described here can be constructed to decode signals having more than two signal layers.

3. Receiver System

Figure 4:
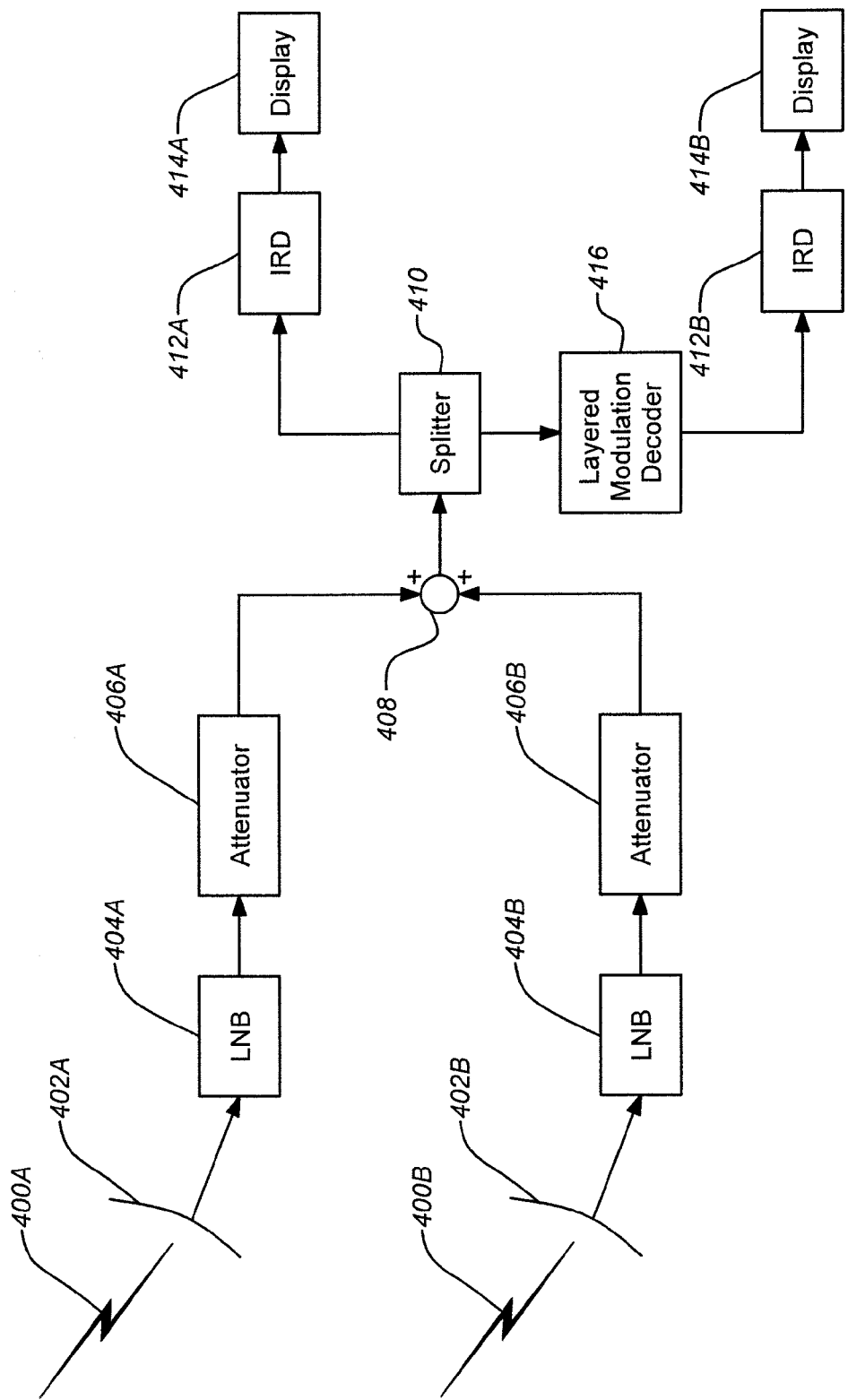
FIG. 4 is a block diagram of a receiving architecture of the invention.

FIG. 4 is a block diagram of a receiving architecture for demonstrating the invention method. Emulated layered signals 400A, 400B are received by receiving dishes 402A, 402B (which can alternately be combined in a single dish with a single LNB). The signals 400A, 400B can each be transmitted by distinct transmitters from a single or separate satellites, but they exist in interfering frequency bands, e.g. 12.5 GHz. The received layered signals 400A, 400B are then directed through respective low noise blocks (LNBs) 404A, 404B and attenuators 406A, 406B. The LNBs 404A, 404B convert each of the received layered signals 400A, 400B to an intermediate frequency range, e.g. 950-1450 MHz. The layered signals are combined at the summation block 408, with their relative power levels adjusted by the attenuators 406A, 406B.

It should be noted that the details regarding the reception of the layered signal up to the summation block 408 are not critical to the operation of the invention and shown only as one example. Many designs are possible. For example, as previously mentioned, the same receiver dish can be used for both layered signals 400A, 400B. The result of two acceptably interfering layered signals on the same input is the only requirement.

The combined layered signals 400A, 400B can then be split at splitter 410 to direct the layered signal to alternate legacy IRDs 412A, 412B. One of the legacy IRDs 412A demodulates and decodes the upper layer signal of the signals 400A, 400B and ignores the other as noise. The decoded upper layer signal is then delivered to a display 414A. The other legacy IRD 412B has the layered signals 400A, 400B preprocessed by a layered modulation decoder 416 such that the lower layer signal of the signals 400A, 400B is converted to a signal compatible with the other legacy IRD 412B (and the upper layer signal of the signals 400A, 400B is effectively filtered out). The converted lower layer signal is then demodulated and decoded by the other legacy IRD 412B and the result delivered to a display 414B. Of course, alternate architectures can employ a single display switched between signals from the separate IRDs 412A, 412B.

4. Layered Modulation Decoder

Figure 5:
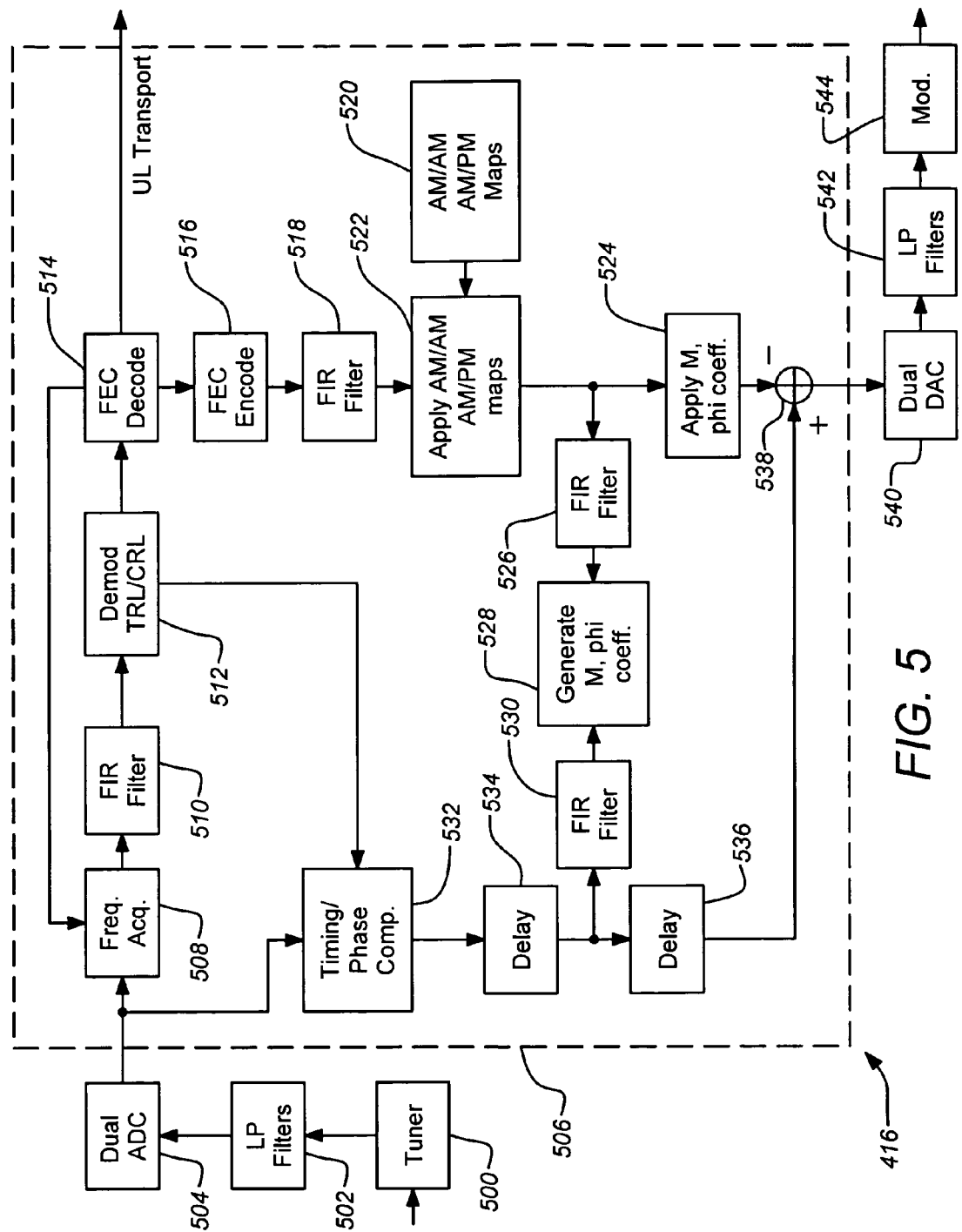
FIG. 5 is a block diagram of a layered modulation decoder of the invention.

FIG. 5 is a block diagram of a layered modulation decoder 416 of the invention. The layered modulation decoder 416 preprocesses an incoming layered signal to extract a lower layer signal and convert it to a signal that is decodable by a legacy receiver, as previously discussed.

After the splitter 410, the incoming layered signal is upper tuned to convert it to a baseband in-phase (I) and quadrature (Q) signal by tuner 500. The separate signals can then be filtered by a low pass filter 502 in preparation for digitizing. The signals are then digitized at a high sampling rate and sufficient resolution by an analog-to-digital converter (ADC) 504. A dual channel ADC 504 or separate ADCs can be used for the separate in-phase and quadrature signals. The digitized signals are then communicated to a processor 506.

The processor 506 for extracting a lower layer signal can be implemented as a logic circuit. The entering digitized in-phase and quadrature signals can be first split into two paths that will become the upper layer and composite layered signals. On the signal path for the upper layer, the in-phase and quadrature signals can first be passed through a frequency acquisition loop 508. The can then be filtered through a finite impulse response (FIR) matched filter 510. A demodulator 512 demodulates the signals, using carrier and timing recovery loops to produce demodulated layered in-phase and quadrature signals. The demodulated signals are then decoded by decoder 514 which can incorporate Viterbi decoding, deinterleaving and Reed-Solomon (RS) decoding functions as appropriate to accurately determine the upper layer symbols. The decoded upper layer symbols are then applied to an encoder 516 in order to produce an ideal upper layer signal (i.e. an upper layer signal transmitted without the noise and/or interference of the lower layer signal). The encoded signal emerges again as in-phase and quadrature signal components. A variety of signal processing techniques can be applied to these signals to produce the ideal upper layer.

The ideal upper layer signal can be filtered through an FIR matched filter 518. Characteristics of the transmission (e.g. amplifier nonlinearities, etc.) can be accounted for by signal maps 520, such as an amplitude modulation to amplitude modulation (AM/AM) map and/or an amplitude modulation to phase modulation map (AM/PM). These signal maps 520 can be updated to account for changes in the transmission characteristics of the satellite. The signal maps 520 are applied 522 to the encoded signals to simulate downlink transmission of an upper layer signal. Similarly, an additional FIR matched filter 526 can also be applied after accounting for transmission characteristics 522. In addition, an upper layer amplitude and phase matching function 528, driven by the demodulated layered signal and the ideal reconstructed upper layer signal, can also be used to generate matching coefficients. The matching coefficients are applied 524 to the reconstructed upper layer signal to ensure that it is appropriately scaled in magnitude and rotated in phase as compared to the layered signal, for maximum cancellation in the final signal subtraction.

Ultimately, the ideal reconstructed in-phase and quadrature signals for the upper layer are subtracted from the layered in-phase and quadrature signals that are produced by the demodulator at a subtractor 538. A timing and phase compensation function 532 is applied to the second layered path entering the processor 506, using information from the demodulator 512. A fixed delay 534 can be applied to the second layered signal path to determine the appropriate delay to align the layered and ideal signals to generate matching coefficients 528. The delayed layered signal is split and in one path, an FIR matched filter 530 can be applied to it before generating matching coefficients 528. The second delayed layered signal path is delayed again 536 to align it appropriately with the ideal upper layer signal for subtraction 538. The results of the subtraction are the in-phase and quadrature signals of the lower layer.

The in-phase and quadrature signals of the lower layer, output from the subtractor 538, are first converted to analog signals in an digital-to-analog converter (DAC) 540. The DAC essentially reverses the prior digitizing and therefore may use the same sampling rate and resolution. Following this, the analog form signals can be filtered by a low pass filter 542 and passed to a modulator 544 (e.g. a QPSK modulator) to produce the lower layer signal in a format for a legacy receiver to decode, as the output of the processor 416.

Figure 6:
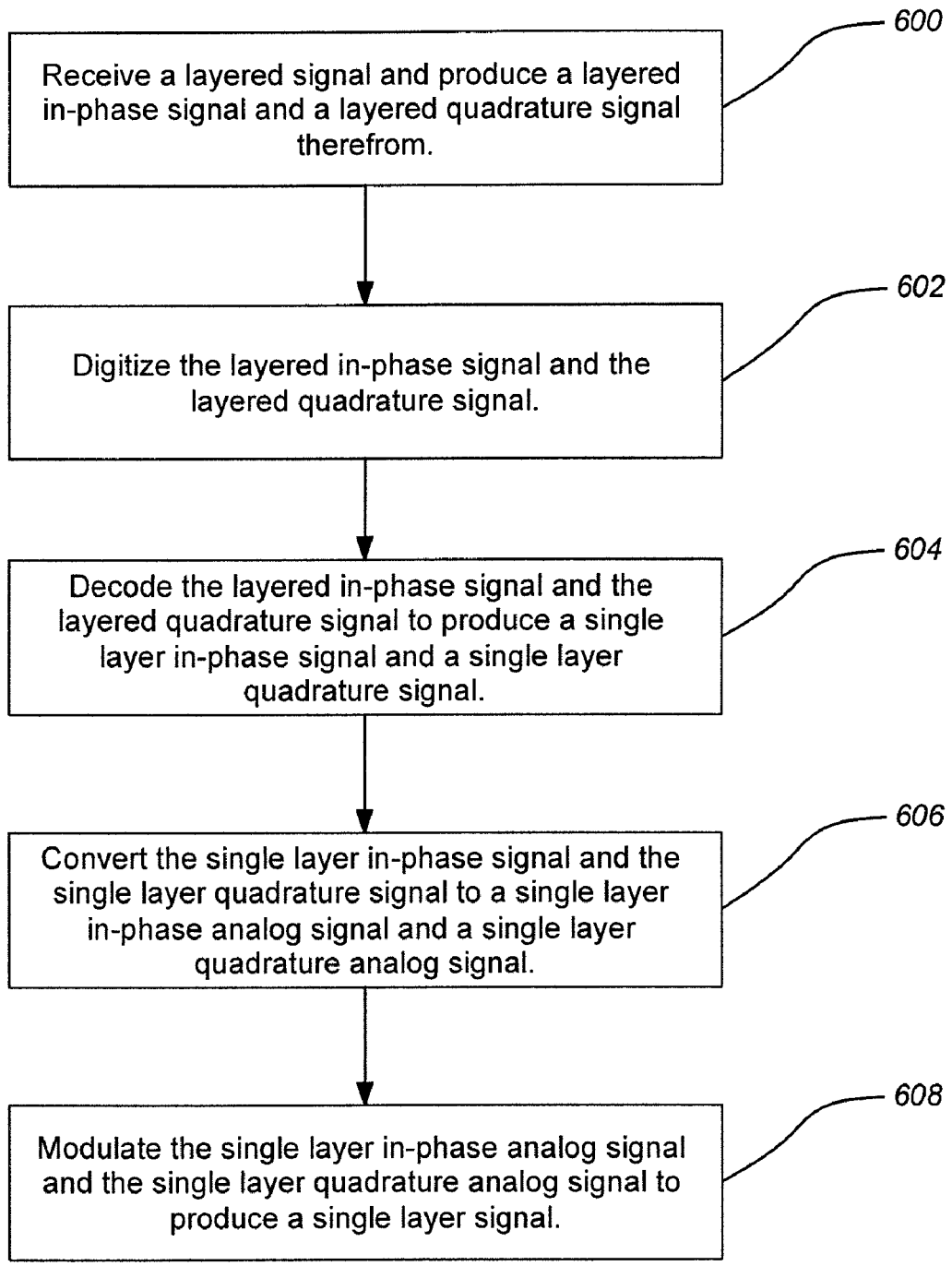
FIG. 6 is a method of a layered modulation decoding according to the invention.

FIG. 6 describes a method of a layered modulation decoding according to the invention. A layered signal is received and a layered in-phase signal and a layered quadrature signal are produced from it at block 600. Next, the layered in-phase signal and the layered quadrature signal are digitized at block 602. At block 604, the layered in-phase signal and the layered quadrature signal are decoded to produce a single layer in-phase signal and a single layer quadrature signal. Then at block 606, the single layer in-phase signal and the single layer quadrature signal are converted to a single layer in-phase analog signal and a single layer quadrature analog signal. Finally, at block 608 the single layer in-phase analog signal and the single layer quadrature analog signal are modulated to produce a single layer signal.

CONCLUSION

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. An apparatus for receiving a non-coherent layered modulation signal comprising the sum of a first layer signal and a second layer signal, comprising:

a tuner for receiving the non-coherent layered signal and producing a layered in-phase signal and a layered quadrature signal therefrom;

an analog-to-digital converter for digitizing the layered in-phase signal and the layered quadrature signal;

a digital processor for processing the digitized layered in-phase signal and the digitized layered quadrature signal to produce a lower layer in-phase signal, a lower layer quadrature signal, an upper layer in-phase signal and an upper layer quadrature signal, the processor comprising a subtractor configured to subtract an ideal upper layer in-phase signal from the digitized layered in-phase signal to produce the lower layer in-phase signal and to subtract an ideal upper layer quadrature signal from the digitized layered quadrature signal to produce the lower layer quadrature signal;

a digital-to-analog encoder for converting the lower layer in-phase signal and the lower layer quadrature signal to a lower layer in-phase analog signal and a lower layer quadrature analog signal; and a modulator for modulating the lower layer in-phase analog signal and the lower layer quadrature analog signal to produce a lower layer signal.

2. The apparatus of claim 1, wherein the non-coherent layered signal is compatible with a legacy receiver such that at least one signal layer is decodeable directly from the layered signal with the legacy receiver.

3. The apparatus of claim 1, wherein the processor comprises a logic circuit.

4. The apparatus of claim 1, wherein processing by the processor comprises match filtering the digitized layered in-phase signal and the digitized layered quadrature signal.

5. The apparatus of claim 1, wherein the digitized layered in-phase signal and the digitized layered quadrature signal are delayed to synchronize the subtraction.

6. The apparatus of claim 1, wherein the processor applies a signal map to the ideal upper layer in-phase signal and the ideal upper layer quadrature signal, the signal map accounting for transmission distortions of the non-coherent layered signal.

7. The apparatus of claim 1, wherein the processor amplitude and phase matches the ideal upper layer in-phase signal and the ideal upper layer quadrature signal with the digitized layered in-phase signal and the digitized layered quadrature signal, respectively.

8. A digital processor for decoding a non-coherent layered signal to produce a single layer signal, comprising:

a demodulator and decoder for decoding an upper layer signal from the non-coherent layered signal;

an encoder for generating an ideal upper layer signal from the decoded upper layer signal;

a signal processor for modifying the ideal upper layer signal to characterize transmission and processing effects; and a subtractor for subtracting the modified ideal upper layer signal from the layered signal to produce the single layer signal.

9. The digital processor of claim 8, further comprising a delay function correlated to an output of the signal processor to appropriately delay the layered signal to synchronize amplitude and phase matching of the modified ideal upper layer signal and the layered signal.

10. The digital processor of claim 8, further comprising a delay function correlated to an output of the signal processor to appropriately delay the layered signal to synchronize subtraction of the modified ideal upper layer signal and the layered signal.

11. The digital processor of claim 8, wherein the signal processor amplitude and phase matches the ideal upper layer signal with the layered signal.

12. The digital processor of claim 9, wherein the signal processor applies a signal map to the ideal upper layer signal.

13. The digital processor of claim 9, wherein the signal processor performs finite impulse response matched filtering on the ideal upper layer signal.

14. A method of receiving a non-coherent layered modulation signal, comprising the steps of:

receiving the non-coherent layered signal and producing a layered in-phase signal and a layered quadrature signal therefrom;

digitizing the layered in-phase signal and the layered quadrature signal;

processing the digitized layered in-phase signal and the digitized layered quadrature signal to produce a lower layer in-phase signal, a lower layer quadrature signal, an upper layer in-phase signal, and an upper layer quadrature signal;

subtracting an ideal upper layer in-phase signal from the digitized layered in-phase signal to produce the lower layer in-phase signal and subtracting an ideal upper layer quadrature signal from the digitized layered quadrature signal to produce the lower layer quadrature signal;

converting the lower layer in-phase signal and the lower layer quadrature signal to a lower layer in-phase analog signal and a lower layer quadrature analog signal; and modulating the lower layer in-phase analog signal and the lower layer quadrature analog signal to produce a single layer signal.

15. The method of claim 14, wherein the non-coherent layered signal is compatible with a legacy receiver such that at least one signal layer is decodeable directly from the layered signal with the legacy receiver.

16. The method of claim 14, wherein the lower layer signal from the modulator is decodeable with a legacy receiver.

17. The method of claim 14, wherein the steps of processing and subtracting are performed by a logic circuit.

18. The method of claim 14, wherein the step of processing comprises match filtering the digitized layered in-phase signal and the digitized layered quadrature signal.

19. The method of claim 15, wherein the step of processing further comprises delaying the digitized layered in-phase signal and the digitized layered quadrature signal to synchronize the subtraction.

20. The method of claim 15, further comprising the step of applying a signal map to the ideal upper layer in-phase signal and the ideal upper layer quadrature signal, the signal map accounting for transmission distortions of the non-coherent layered signal.

21. The method of claim 15, further comprising the step of amplitude and phase matching the ideal upper layer in-phase signal and the ideal upper layer quadrature signal with the digitized layered in-phase signal and the digitized layered quadrature signal, respectively.

* * * * *